July 7, 1936. A. VAN WIJK 2,046,980
GASEOUS ELECTRIC DISCHARGE DEVICE
Filed Dec. 23, 1935
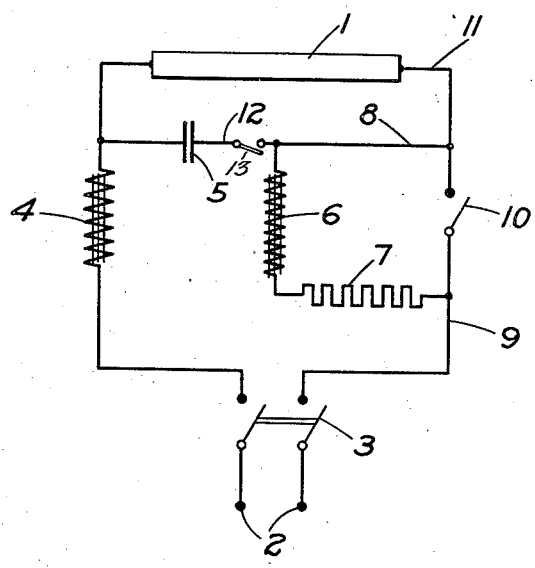
INVENTOR
Aart van Wijk
BY Harry E. Dunham
ATTORNEY Patented July 7, 1936

2,046,980

UNITED STATES PATENT OFFICE 2,046,980

GASEOUS ELECTRIC DISCHARGE DEVICE

Aart van Wijk, Eindhoven, Netherlands, assignor to General Electric Company, a corporation of New York Application December 23, 1935, Serial No. 55,860
In Germany December 14, 1934

3 Claims. (Cl. 176—124)

The present invention relates to gaseous electric discharge devices generally and more particularly the invention relates to starting and operating circuits for such devices.

It is customary when operating a gaseous electric discharge device on alternating current to use an inductance as the series impedance for such device which inductance stabilizes the discharge and limits the discharge current in the device to a desired value. In some instances a choke coil is used and in others a leaky transformer is used as the series impedance. A condenser connected in parallel with the discharge device and in series with the inductance facilitates the starting of the device. The alternating current source, the inductance and the condenser form a circuit before the discharge device has started. A high potential builds up between the plates of the condenser, higher than the voltage of the current source, which starts the gaseous electric discharge in the device. The magnitude of the condenser voltage is determined by the ratio between the resistance of the inductance and that of the condenser to the alternating current.

While the above described circuit is useful in many cases there are, nevertheless, many disadvantages connected therewith. The size of the inductance is determined mainly by voltage of the current source and the starting and operating characteristics of the gaseous electric discharge. Therefore, when it is desired to have the inductance and the condenser in resonance it is necessary to change the size of the condenser since, as pointed out above, the inductance must be of a certain size with relation to the voltage of the current source and the starting and operating characteristics of the discharge device. For this reason condensers of large size are frequently required and heavy currents must flow through the starting circuit in order to build up in the condenser sufficient voltage to start the discharge device. The apparatus thus is very expensive in certain instances. A further disadvantage of such a circuit is that it is impossible to use an ohmic resistance in place of the inductance as the series impedance.

The object of the present invention is to provide a circuit of the above type in which the above disadvantages are avoided. Still further objects and advantages attaching to the device and to its use and operation will be apparent to those skilled in the art from the following particular description.

The invention attains its objects by connecting into the circuit an auxiliary inductance connected in series with the condenser and providing means in the circuit for short-circuiting this auxiliary inductance. It will be understood that a series impedance for the gaseous electric discharge device is likewise connected into the circuit. In starting the gaseous electric discharge device the auxiliary inductance is connected into the circuit to form a starting circuit consisting of the alternating current source, the auxiliary inductance, the condenser and the series impedance. After the gaseous electric discharge device has been started into operation the auxiliary inductance is short-circuited so that the auxiliary inductance has no affect on the operating current of the gaseous electric discharge device. The auxiliary inductance, which is connected into the circuit only during the starting period, can be designed independently of the voltage of the current source, the starting and operating characteristics of the gaseous electric discharge device and the series impedance for the discharge device. Hence in the circuit according to the present invention more latitude is permissible in designing the condenser and the inductance. When desired, the inductance is very large which permits the use of a small condenser.

When desired, the current flow through the starting circuit is limited to a small value during the starting of the gaseous electric discharge device. An ohmic resistance connected in series with the auxiliary inductance is used to limit the current flow through the starting circuit, when desired. Preferably this resistance is short circuited with the auxiliary inductance after the gaseous electric discharge device has started.

In the drawing accompanying and forming part of this specification a wiring diagram of a circuit embodying the invention is shown, the gaseous electric discharge device being represented schematically.

Referring to the drawing the circuit comprises a gaseous electric discharge device 1 comprising an elongated, tubular container having a thermionic electrode sealed therein at each end thereof. Said electrodes consist of a refractory metal, such as tungsten or nickel, coated or impregnated with materials of a high electron emissivity, such as barium or strontium oxide, and which are heated directly by the discharge current or by a special heating current. The container has a rare, starting gas therein, such as neon, argon, or krypton, or mixtures thereof, at a pressure of a few millimeters and a quantity of mercury the vapor of which is luminous during the operation of the device. When the wall of the container consists of a material which transmits ultra-violet light, such as quartz, the device is useful as an ultra-violet generator since ultra-violet rays are generated by the positive column discharge in the mercury vapor.

The device 1 is connected to the terminals of an alternating current source 2, such as a 220 or 380 volt alternating current source. A double-pole switch 3 is provided in the circuit to connect and disconnect said device 1 to and from said source 2. The series impedance in the circuit consists of a choke coil 4 connected in series with the device 1. A condenser 5 is connected by current lead 8 in parallel to the device 1 and a choke coil 6 is connected in series with an ohmic resistance 7 between the lead 8 and the lead 9. A switch 10 is connected into the leads 8 and 9 which when closed short-circuits the choke coil 6 and the resistance 7 and connects the current lead 11 of the device 1 over the switch 3 directly to the current source 2.

The switch 10 is preferably a push-button switch and is closed in the normal position (that is when no pressure is exerted on the button) and moves to the open position thereof when pressure is applied thereto.

In starting the device 1 the switch 10 is opened (by applying pressure on the push-button) and the switch 3 is closed. The choke coil 4, the condenser 5, the choke coil 6 and the resistance 7 are then connected in series and form, together with the current source 2, a circuit through which alternating current flows. The choke coil 6 has a much larger inductance than the choke coil 4, and the condenser 5 and the choke coil 6 are of such a size that the circuit is tuned in resonance, or approximately in resonance, for the fundamental frequencies of the alternating current source 2. A high voltage then occurs between the plates of the condenser 5 which starts the discharge in the device 1. When the device 1 has been started the switch 10 is closed by releasing the pressure thereon which short circuits the choke coil 4 and the resistance 7 and connects the discharge device 1 directly to the current source 2 in series with the choke coil 4.

Preferably a current-interrupting device, such as a switch 13, is connected into the lead 12 which switch 13 is opened after the starting of the device 1 whereby the parallel circuit comprising the condenser 5 is broken. This interrupting device is connected with the switch 10 in such a way that both these elements are actuated simultaneously, when desired. This switch is actuated automatically, when desired, by a means actuated by the discharge current of the device 1.

As the size of the choke coil 6 and of the condenser 5 is independent of a certain required size of the choke coil 4, it is possible to select the inductance of the choke coil 6 larger, and even very much larger, than the normal series impedance, so that the condenser 5 can be made considerably smaller than in the case in which it was necessary to bring it into resonance with the normal series impedance.

By way of illustration let us take the following examples:

A circuit comprising a 220 volt, 50 cycle alternating current source, a gaseous electric discharge device operating with a discharge current of 4.5 amperes and requiring a voltage of 300 volts to start the discharge, a condenser connected in parallel with the device and a choke-coil connected in series with said device. In order to regulate the discharge current in the discharge device to 4.5 amperes the choke-coil should have an inductance of 30 ohms. In order to obtain resonance in the circuit the condenser must have a capacitance of 30 ohms and, therefore, a 100 microfarad condenser is necessary. The resonance voltage at the condenser must be at least 300 volts to start the device which requires a current of 10 amperes in the resonance circuit.

In a circuit according to the present invention much more advantageous dimensions can be selected. The choke-coil 4, of course, must have an inductance of 30 ohms, but the capacitance of the condenser 5 can be very low, such as 0.1 microfarad provided the choke-coil 6 has sufficient inductance. In the above example the circuit 2—4—6—7—9 is in resonance for the fundamental frequency of the alternating current source when the choke coil 6 has an inductance of 30,000 ohms. When the various elements of the circuit have the above characteristics a current flow of approximately 10 milliamperes in the starting circuit is sufficient to create at the condenser 5 a voltage of 300 volts. The ohmic resistance in the resonant circuit is approximately 20,000 ohms which is furnished principally by the resistance 7. The choke coil 6 has a high ohmic resistance, when desired, and the separate resistance 7 is omitted.

It is apparent from the above examples that the circuit according to the present invention possesses unique advantages over prior circuits including the advantage that a smaller and less expensive condenser can be used and since the choke-coil 6 and the resistance 7 carry small currents and these only during the starting period these elements can be selected of small size and are inexpensive. A further advantage of the present circuit is that an ohmic resistance can be used in place of the inductance 4 as the series impedance for the device 1, when desired.

What I claim as new and desire to secure by Letters Patent of the United States, is:—

1. A circuit for starting and operating a gaseous electric discharge device comprising in combination, an alternating current source, an impedance connected in series with said device across the terminals of said current source, a condenser and an inductance connected in series with each other and across the terminals of said discharge device and means to short circuit said inductance during the operation of said discharge device.

2. A circuit for starting and operating a gaseous electric discharge device comprising in combination, an alternating current source, an impedance connected in series with said device across the terminals of said current source, a condenser, an inductance and a resistance connected in series with each other and across the terminals of said discharge device and means to short circuit said inductance and said resistance during the operation of said discharge device.

3. A circuit for starting and operating a gaseous electric discharge device comprising in combination, an alternating current source, an impedance connected in series with said device across the terminals of said current source, a condenser, an inductance and a resistance connected in series with each other and across the terminals of said discharge device, means to short circuit said inductance and said resistance during the operation of said discharge device and means to cut said condenser out of circuit during the operation of said device.

AART VAN WIJK.